(12) United States Patent
Luo et al.

(10) Patent No.: US 10,973,357 B2
(45) Date of Patent: Apr. 13, 2021

(54) SPLIT ELECTRIC RICE COOKER WITH WEIGHING DEVICE AND PRESS COVER

(71) Applicant: FOSHAN SHUNDE MIDEA ELECTRICAL HEATING APPLIANCES MANUFACTURING CO., LIMITED, Foshan (CN)

(72) Inventors: Zhixiao Luo, Foshan (CN); Chuanbin Zhu, Foshan (CN); Xianhuai Chen, Foshan (CN); Zhengting Fu, Foshan (CN); Linbo Zhu, Foshan (CN); Wei Yuan, Foshan (CN); Wei Chen, Foshan (CN); Yuquan Wu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 198 days.

(21) Appl. No.: 16/272,936

(22) Filed: Feb. 11, 2019

(65) Prior Publication Data
US 2019/0174944 A1    Jun. 13, 2019

Related U.S. Application Data

(63) Continuation of application No. PCT/CN2017/117264, filed on Dec. 19, 2017.

(30) Foreign Application Priority Data

Mar. 31, 2017 (CN) .................... 201720340932.X
Mar. 31, 2017 (CN) .................... 201720340951.2

(51) Int. Cl.
*A47J 27/08*    (2006.01)
*A47J 36/00*    (2006.01)
(Continued)

(52) U.S. Cl.
CPC ............. *A47J 27/002* (2013.01); *A47J 27/00* (2013.01); *A47J 27/004* (2013.01); *A47J 27/086* (2013.01);
(Continued)

(58) Field of Classification Search
CPC ........ A47J 27/002; A47J 27/00; A47J 27/004; A47J 27/086; A47J 36/00; G01G 19/52; G01G 3/14; G01G 21/28
See application file for complete search history.

(56) References Cited

U.S. PATENT DOCUMENTS 4,433,741 A * 2/1984 Ryckman, Jr. ....... G01G 3/1402
177/199
4,582,151 A    4/1986 Mairot et al.
(Continued)

FOREIGN PATENT DOCUMENTS

CN    1109587 A    4/1995
CN    204359422 U    5/2015
(Continued)

OTHER PUBLICATIONS

Foshan Shunde Midea Electrical Heating Appliances Manufacturing Co. Limited, Extended European Search Report, EP17895509.2, dated Sep. 18, 2019, 7 pgs.
(Continued)

*Primary Examiner* — Randy W Gibson
(74) *Attorney, Agent, or Firm* — Morgan, Lewis & Bockius LLP

(57) ABSTRACT

A split electric rice cooker includes: a base (100) provided with a weighing-device mounting groove (120) at a bottom thereof; a cooker body configured to rest on the base (100) and separable with respect to the base (100); a weighing device (500) provided in the weighing-device mounting groove (120), the weighing device (500) comprising a
(Continued)

weighing sensor (510) and a support leg (520); a press cover (600) provided to the bottom of the base (100) and shielding the weighing-device mounting groove (120), the press cover (600) being provided with a press-cover clearance hole (601) for the support leg (520) to pass downwards, and the support leg (520) being connected to the weighing sensor (510); or the support leg (520) being integrally provided to the press cover (600) and able to push the weighing sensor (520) along with deformation of the press cover.

16 Claims, 8 Drawing Sheets

(51) Int. Cl.
*G01G 19/52* (2006.01)
*A47J 27/00* (2006.01)
*A47J 27/086* (2006.01)
*G01G 3/14* (2006.01)
*G01G 21/28* (2006.01)

(52) U.S. Cl.
CPC ............... *G01G 19/52* (2013.01); *A47J 36/00* (2013.01); *G01G 3/14* (2013.01); *G01G 21/28* (2013.01)

(56) References Cited

U.S. PATENT DOCUMENTS

| | | | | |
|---|---|---|---|---|
| 5,886,302 A * | 3/1999 | Germanton | ............. | G01G 3/13 |
| | | | | 174/135 |
| 5,929,391 A * | 7/1999 | Petrucelli | ................ | G01G 3/08 |
| | | | | 177/211 |
| 8,648,267 B2 * | 2/2014 | Honda | ................... | G01G 21/23 |
| | | | | 177/211 |
| 9,046,408 B2 * | 6/2015 | Chan | ...................... | G01G 21/23 |
| 2002/0088795 A1 * | 7/2002 | Chu | ..................... | A47J 36/2483 |
| | | | | 219/518 |
| 2014/0008133 A1 | 1/2014 | Chan | | |
| 2018/0368615 A1 * | 12/2018 | Luo | ......................... | A47J 36/06 |
| 2019/0246829 A1 * | 8/2019 | Zhou | ..................... | G01G 19/56 |

FOREIGN PATENT DOCUMENTS

| | | |
|---|---|---|
| CN | 105832126 A | 8/2016 |
| CN | 205410805 U | 8/2016 |
| CN | 206006876 U | 3/2017 |
| JP | 2010104669 A | 5/2010 |
| JP | 2014036760 A | 2/2014 |
| JP | 2015221173 A | 12/2015 |
| WO | WO2016056245 A1 | 4/2016 |

OTHER PUBLICATIONS

Foshan Shunde Midea Electrical Heating Appliances Manufacturing Co. Limited, International Search Report and Written Opinion, PCT/CN2017/117264, dated Mar. 15, 2018, 13 pgs.
Notification of Reason for Refusal, KR1020187019147, dated Jun. 14, 2019, 8 pgs.
Notification of Reason for Refusal, KR1020187019147, dated Dec. 6, 2019, 8 pgs.
Notice of Reasons for Refusal, JP2018-544935, dated Oct. 25, 2019, 10 pgs.
Final Notification of Reasons for Refusal, JP2018-544935, dated Jun. 9, 2020, 6 pgs.

\* cited by examiner

SPLIT ELECTRIC RICE COOKER WITH WEIGHING DEVICE AND PRESS COVER

PRIORITY CLAIM AND RELATED APPLICATION

This application is a continuation application of PCT/CN2017/117264, entitled "SPLIT ELECTRIC RICE COOKER" filed on Dec. 19, 2017, which claims priority to Chinese Patent Application No. 201720340951.2, filed with the State Intellectual Property Office of the People's Republic of China on Mar. 31, 2017, and entitled "SPLIT ELECTRIC RICE COOKER", and Chinese Patent Application No. 201720340932.X, filed with the State Intellectual Property Office of the People's Republic of China on Mar. 31, 2017, and entitled "SPLIT ELECTRIC RICE COOKER", all of which are incorporated herein by reference in their entirety.

TECHNICAL FIELD

The present disclosure relates to a technical field of household appliances, and specifically to a split electric rice cooker.

BACKGROUND

In the related art, small home appliances have been popularized in people's lives, and each family basically possesses an electric rice cooker, an induction cooker and other household appliances. More and more products may be placed in a kitchen with product diversification. In order to reduce household appliances and thus reduce their occupation of the kitchen space, the electric rice cooker and the induction cooker can be integrated into a split electric rice cooker. A base of an existing split electric rice cooker cannot recognize whether a cooker body matches the base, and especially in a case of various cooker bodies, a phenomenon of mismatch is prone to occur and influences normal use of the product.

SUMMARY

The present disclosure seeks to solve one of the technical problems existing in the related art to at least some extent.

Thus, an objective of the present disclosure is to propose a split electric rice cooker having a weighing function.

The split electric rice cooker according to embodiments of a first aspect of the present disclosure includes: a base provided with a weighing-device mounting groove at a bottom thereof; a cooker body configured to rest on the base and separable with respect to the base; a weighing device provided in the weighing-device mounting groove, and including a weighing sensor and a support leg connected to the weighing sensor; and a press cover provided to the bottom of the base and shielding the weighing-device mounting groove, the press cover being provided with a press-cover clearance hole for the support leg to pass downwards.

The split electric rice cooker according to embodiments of the present disclosure has the weighing function, and the base is able to weigh the cooker body, so that the base and the cooker body can be properly fitted.

In addition, the split electric rice cooker according to embodiments of the present disclosure can further have the additional technical features as follows.

In the split electric rice cooker according to an embodiment of the present disclosure, a support plate and a vertical snapping plate are provided in the weighing-device mounting groove, and the weighing sensor is sandwiched between the vertical snapping plate and the support plate.

According to some embodiments of the present disclosure, the support plate includes: a first support plate, a second support plate, a third support plate, and a fourth support plate; the first support plate, the second support plate, the third support plate, and the fourth support plate are provided to a first side wall, a second side wall, a third side wall and a fourth side wall of the weighing-device mounting groove respectively; the first side wall, the second side wall, the third side wall and the fourth side wall are connected successively.

According to some embodiments of the present disclosure, the weighing sensor includes a body portion and a cantilever weighing portion, the body portion is an annular frame body, and the cantilever weighing portion is provided within the body portion.

According to some embodiments of the present disclosure, the cantilever weighing portion includes a first cantilever and a second cantilever; the first cantilever is T-shaped and includes a transverse section and a longitudinal section; the longitudinal section is connected to the body portion, and two ends of the transverse section are separately provided with the second cantilever.

According to some embodiments of the present disclosure, the body portion includes: a first frame bar, a second frame bar, a third frame bar, and a fourth frame bar connected successively; the first frame bar is adjacent to the transverse section; the first frame bar, the second frame bar, the third frame bar, and the fourth frame bar are apt to abut against the first support plate, the second support plate, the third support plate, and the fourth support plate respectively.

According to some embodiments of the present disclosure, the first support plate has an inverted three-step structure; the third support plate has an inverted two-step structure; the first frame bar is apt to abut against a bottom surface of a second step of the first support plate; the transverse section is suspended below a bottom surface of a first step of the first support plate; a clearance space for evading the transverse section is defined between the first step and the second step of the first support plate; and the third frame bar is apt to abut against a bottom surface of a first step of the third support plate.

According to some embodiments of the present disclosure, the bottom surface of the second step of the first support plate is flush with the bottom surface of the first step of the third support plate.

According to some embodiments of the present disclosure, a third step of the first support plate and a second step of the third support plate clamp and respectively abut against the first frame bar and the third frame bar, so as to limit the position of the body portion in a direction parallel to the longitudinal section.

According to some embodiments of the present disclosure, a bottom surface of the third step of the first support plate and a bottom surface of the second step of the third support plate are both configured as a guide bevel.

According to some embodiments of the present disclosure, the second support plate and the fourth support plate are respectively located outside the second cantilevers of the corresponding sides to evade the second cantilevers.

According to some embodiments of the present disclosure, a limiting protrusion is provided on each of the second support plate and the fourth support plate, and the limiting protrusion on the second support plate and the limiting protrusion on the fourth support plate clamp and respectively abut against the second frame bar and the fourth frame bar, so as to limit the position of the body portion in a direction parallel to the transverse section.

According to some embodiments of the present disclosure, each of the second support plate and the fourth support plate is divided into two sections spaced apart from each other, and one vertical snapping plate is disposed between the two sections.

In the split electric rice cooker according to an embodiment of the present disclosure, the bottom of the base is further provided with an catching groove, the press cover is further provided with a pre-assembled catching portion, and the pre-assembled catching portion is engaged within the catching groove.

In the split electric rice cooker according to an embodiment of the present disclosure, the press cover is further fastened to the bottom of the base through a press-cover threaded assembly.

The split electric rice cooker according to embodiments of a second aspect of the present disclosure includes: a base provided with a weighing-device mounting groove at a bottom thereof; a cooker body configured to rest on the base and separable with respect to the base; a weighing device fixed in the weighing-device mounting groove and including a body portion and a cantilever weighing portion, the cantilever weighing portion being provided on the body portion; a press cover provided to the bottom of the base and shielding the weighing-device mounting groove, the press cover being integrally provided with a support leg, and the support leg being supported on a bottom surface of the cantilever weighing portion and being able to be deformed along with the press cover and push the cantilever weighing portion upwards.

The split electric rice cooker according to embodiments of the present disclosure has a compact structure and is easy to assemble.

According to some embodiments of the present disclosure, the press cover is provided with a weakening structure.

According to some embodiments of the present disclosure, the weakening structure is a weakening groove penetrating the press cover.

According to some embodiments of the present disclosure, the weakening groove is arc-shaped.

According to some embodiments of the present disclosure, a plurality of weakening grooves are provided and distributed around the support leg, and a distance between an inner end of each weakening groove and a central axis of the support leg is smaller than a distance between an outer end of the weakening groove and the central axis.

According to some embodiments of the present disclosure, respective inner ends of the weakening grooves are equally distant from the central axis, and respective outer ends of the weakening grooves are also equally distant from the central axis.

According to some embodiments of the present disclosure, the plurality of weakening grooves are equally spaced.

According to some embodiments of the present disclosure, the support leg includes an upper leg portion and a lower leg portion, the lower leg portion is provided to a bottom surface of the press cover while the upper leg portion is provided to a top surface of the press cover, and a radial size of the upper leg portion is smaller than a radial size of the lower leg portion.

According to some embodiments of the present disclosure, the press cover and the support leg are an integrally injection-molded part.

According to some embodiments of the present disclosure, the bottom of the base is further provided with an catching groove, the press cover is further provided with a pre-assembled catching portion, and the pre-assembled catching portion is engaged in the catching groove.

According to some embodiments of the present disclosure, the press cover is further fastened to the bottom of the base through a press-cover threaded assembly.

According to some embodiments of the present disclosure, a support plate and a vertical snapping plate are provided in the weighing-device mounting groove, and the weighing device is sandwiched between the vertical snapping plate and the support plate.

According to some embodiments of the present disclosure, the support plate includes: a first support plate, a second support plate, a third support plate, and a fourth support plate; the first support plate, the second support plate, the third support plate, and the fourth support plate are provided to a first side wall, a second side wall, a third side wall and a fourth side wall of the weighing-device mounting groove respectively; the first side wall, the second side wall, the third side wall and the fourth side wall are connected successively.

According to some embodiments of the present disclosure, the body portion is an annular frame body, and the cantilever weighing portion is provided within the body portion.

According to some embodiments of the present disclosure, the cantilever weighing portion includes a first cantilever and a second cantilever; the first cantilever is T-shaped and includes a transverse section and a longitudinal section; the longitudinal section is connected to the body portion, and two ends of the transverse section are separately provided with the second cantilever.

According to some embodiments of the present disclosure, the body portion includes: a first frame bar, a second frame bar, a third frame bar, and a fourth frame bar connected successively; the first frame bar is adjacent to the transverse section; the first frame bar, the second frame bar, the third frame bar, and the fourth frame bar are apt to abut against the first support plate, the second support plate, the third support plate, and the fourth support plate respectively.

According to some embodiments of the present disclosure, the first support plate and the third support plate each have an inverted two-step structure; the first frame bar is apt to abut against a bottom surface of a first step of the first support plate; the third frame bar is apt to abut against a bottom surface of a first step of the third support plate.

According to some embodiments of the present disclosure, a second step of the first support plate and a second step of the third support plate clamp and respectively abut against the first frame bar and the third frame bar, so as to limit the position of the body portion in a direction parallel to the longitudinal section.

According to some embodiments of the present disclosure, the second support plate and the fourth support plate are respectively located outside the second cantilevers of the corresponding sides to evade the second cantilevers.

According to some embodiments of the present disclosure, a limiting protrusion is provided on each of the second support plate and the fourth support plate, and the limiting protrusion on the second support plate and the limiting protrusion on the fourth support plate clamp and respectively abut against the second frame bar and the fourth frame bar, so as to limit the position of the body portion in a direction parallel to the transverse section.

According to some embodiments of the present disclosure, each of the second support plate and the fourth support plate is divided into two sections spaced apart from each other, and one vertical snapping plate is disposed between the two sections.

Additional aspects and advantages of embodiments of present disclosure will be given in part in the following descriptions, become apparent in part from the following descriptions, or be learned from the practice of the embodiments of the present disclosure.

Figure 1:
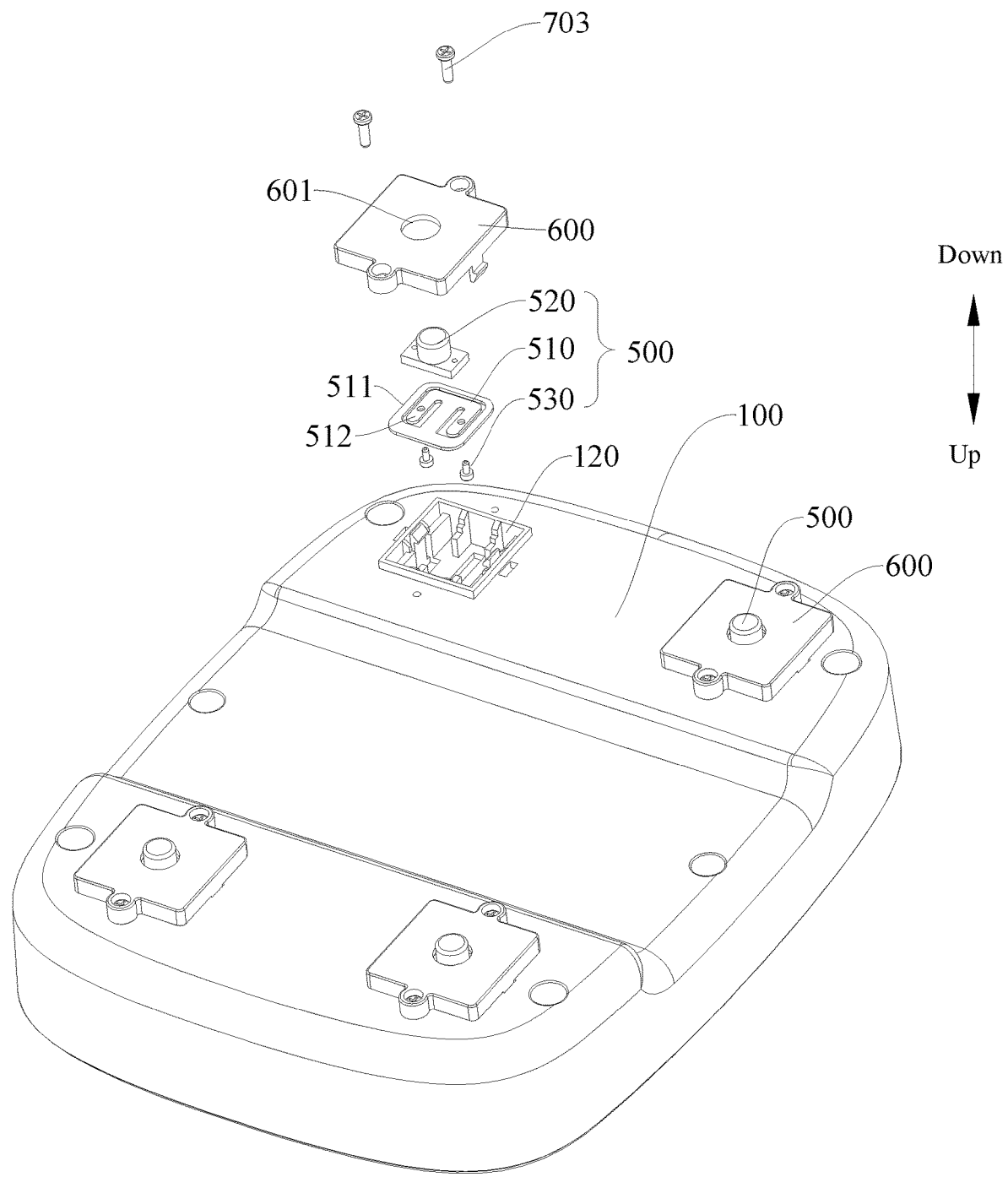
FIG. 1 is a schematic view of a base of a split electric rice cooker according to embodiments of a first aspect of the present disclosure.

REFERENCE NUMERALS base 100, weighing-device mounting groove 120, first side wall 121, second side wall 122, third side wall 123, fourth side wall 124, first support plate 131, first step 1311 of first support plate, second step 1312 of first support plate, third step 1313 of first support plate, second support plate 132, third support plate 133, first step 1331 of third support plate, second step 1332 of third support plate, fourth support plate 134, limiting protrusion 135, vertical snapping plate 140, catching groove 150, weighing device 500, weighing sensor 510, body portion 511, first frame bar 5111, second frame bar 5112, third frame bar 5113, fourth frame bar 5114, cantilever weighing portion 512, first cantilever 5121, transverse section 5121a, longitudinal section 5121b, second cantilever 5122, support leg 520, screw 530, press cover 600, press-cover clearance hole 601, pre-assembled catching portion 602, press-cover threaded assembly 703.

DETAILED DESCRIPTION

The embodiments of the present disclosure are described in detail below, and examples of the embodiments are shown in the accompanying drawings, in which the same or similar reference numerals denote the same or similar elements or elements having the same or similar functions throughout. The embodiments described herein with reference to drawings are explanatory, illustrative, and used to generally understand the present disclosure, and cannot be construed to limit the present disclosure.

A split electric rice cooker according to embodiments of a first aspect of the present disclosure will be described in detail with reference to FIG. 1 to FIG. 4.

As illustrated in FIG. 1, the split electric rice cooker according to embodiments of the present disclosure includes a base 100, a cooker body (not illustrated in drawings), a weighing device 500 and a press cover 600.

The base 100 is provided with a weighing-device mounting groove 120 at the bottom thereof, the cooker body is configured to rest on the base 100 and is separable with respect to the base 100, and the weighing device 500 is provided in the weighing-device mounting groove 120. The weighing device 500 includes a weighing sensor 510 and a support leg 520 connected to the weighing sensor 510. The press cover 600 is provided at the bottom of the base 100 and shields the weighing-device mounting groove 120, and the press cover 600 is provided with a press-cover clearance hole 601 for the support leg 520 to pass downwards.

The split electric rice cooker according to embodiments of the present disclosure has a weighing function. When the cooker body is mounted onto the base 100, the weighing sensor 510 is deformed under the action of gravity of the cooker body, such that the base 100 is able to weigh the cooker body and hence judges whether the cooker body matches it based on a weighing result, thereby improving accuracy of matching the base 100 with the cooker body. Additionally, by sealing the weighing sensor 510 in the weighing-device mounting groove 120 through the press cover 600, not only the weighing sensor 510 can be protected well, but also the split electric rice cooker has a more beautiful appearance.

It could be understood that the weighing sensor 510 sends a detected weight signal to a control element of the cooker body, and the control element judges whether a detected weight value is a preset range and hence judges whether the cooker body matches the base 100.

In a specific embodiment shown in FIG. 1, four corners of the base 100 are respectively provided with one weighing device 500, such that the support leg 520 is able to support the base 100 and the cooker body more stably, and the arrangement of the plurality of weighing devices 500 further improves the accuracy of the weighing result—by calculating an average value of measurement results of the plurality of weighing devices 500 to make the detection result more accurate especially when the center of gravity of the cooker body is biased.

Certainly, the present disclosure is not limited thereto. The number and the arrangement locations of the weighing devices 500 can be varied based on the shape of the base 100, and for example, the number of the weighing devices 500 may be two, three, four or more.

In the split electric rice cooker according to an embodiment of the present disclosure, the weighing-device mounting groove 120 is provided with a support plate and a vertical snapping plate 140 therein, and the weighing sensor 510 is sandwiched between the vertical snapping plate 140 and the support plate. Therefore, by fastening the weighing sensor 510 through the support plate and the vertical snapping plate 140 together provided in the weighing-device mounting groove 120, not only the structure becomes simple and compact, but also the disassembly is convenient.

The vertical snapping plate 140 can fasten the weighing sensor 510 in a vertical direction, and the vertical snapping plate 140 and the support plate together can limit the weighing sensor 510 in a horizontal direction to prevent the weighing sensor 510 from rotating.

According to some embodiments of the present disclosure, the support plate includes a first support plate 131, a second support plate 132, a third support plate 133, and a fourth support plate 134. The first support plate 131, the second support plate 132, the third support plate 133, and the fourth support plate 134 are provided to a first side wall 121, a second side wall 122, a third side wall 123 and a fourth side wall 124 of the weighing-device mounting groove 120 respectively, in which the first side wall 121, the second side wall 122, the third side wall 123 and the fourth side wall 124 are connected successively.

Specifically, the weighing-device mounting groove 120 exhibits a substantially square groove, the first side wall 121 and the third side wall 123 of the weighing-device mounting groove 120 are opposite, the second side wall 122 and the fourth side wall 124 thereof are opposite, and the first to fourth side walls are provided with the first to fourth support plates respectively. An upper surface of the weighing sensor 510 is opposite to respective lower surfaces of the first to fourth support plates, and a lower surface of the weighing sensor 510 abuts against a snap hook of the vertical snapping plate 140, so as to limit the position of the weighing sensor 510 in the vertical direction; respective side surfaces of the first to fourth side walls abut against an outer edge of the weighing sensor 510, so as to limit the position of the weighing sensor 510 in the horizontal direction.

Therefore, the horizontal limiting of the weighing sensor 510 is achieved through the first to fourth support plates, to effectively prevent horizontal rotation of the weighing sensor 510, and enhance stability and reliability of the weighing sensor 510 fixed in the weighing-device mounting groove 120.

Figure 2:
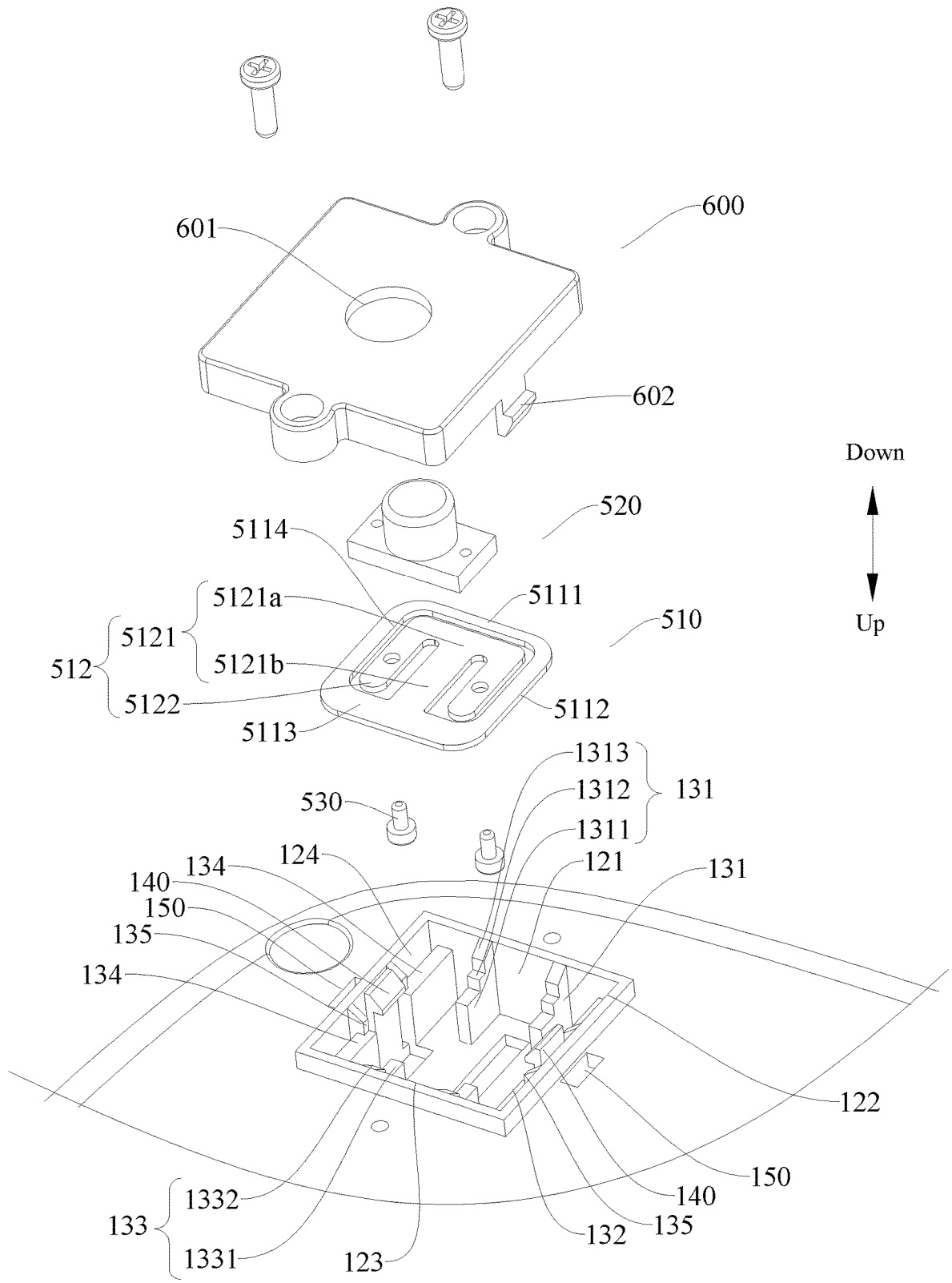
FIG. 2 is a partially enlarged view of FIG. 1.

According to some embodiments of the present disclosure, the weighing sensor 510 includes a body portion 511 and a cantilever weighing portion 512. The body portion 511 is an annular frame body, and the cantilever weighing portion 512 is provided within the body portion 511. Specifically, as illustrated in FIG. 2, the cantilever weighing portion 512 is connected to a part of an inner edge of the body portion 511, the support leg 520 is fixedly connected to a cantilever support portion, and the body portion 511 and the weighing-device mounting groove 120 are fixedly connected.

In this way, the support leg 520 of the base 100 is placed on the ground, and then the cooker body is placed on the base 100; since the weight imposed on the body portion 511 increases (i.e. the added weight of the cooker body), the body portion 511 moves downwards under the action of weight increase and drives the cantilever weighing portion 512 to produce elastic deformation; the weighing sensor 510 sends a corresponding weighing signal based on the amount of elastic deformation and realizes measurement of the weight of the cooker body.

According to some embodiments of the present disclosure, the cantilever weighing portion 512 includes a first cantilever 5121 and a second cantilever 5122. The first cantilever 5121 is T-shaped and includes a transverse section 5121a and a longitudinal section 5121b, the longitudinal section 5121b is connected to the body portion 511, and two ends of the transverse section 5121a are separately provided with the second cantilever 5122. Specifically, referring to FIG. 2, the longitudinal section 5121b has a first end connected to the body portion 511 and a second end connected to a middle portion of the transverse section 5121a; two ends of the transverse section 5121a are connected to two second cantilevers 5122 respectively; the second cantilever 5122 is provided with a mounting hole for fixed connection with the support leg 520, and a screw 530 passes through the second cantilever 5122 and the support leg 520 to fix the support leg 520 on the cantilever weighing portion 512.

Therefore, after the cooker body is placed on the base 100, the body portion 511 moves downwards under the action of the gravity of the cooker body, and drives the longitudinal section 5121b to move and produce elastic deformation with respect to the transverse section 5121a and the second cantilever 5122. The cantilever weighing portion 512 with the above structure can produce the elastic deformation easily and have high sensitivity of weight sensing, and the deformation of the cantilever weighing portion 512 is distributed more evenly, resulting in a more accurate detection result.

In some embodiments, the body portion 511 includes a first frame bar 5111, a second frame bar 5112, a third frame bar 5113, and a fourth frame bar 5114 connected successively. The first frame bar 5111 is adjacent to the transverse section 5121a. The first frame bar 5111, the second frame bar 5112, the third frame bar 5113, and the fourth frame bar 5114 are apt to abut against the first support plate 131, the second support plate 132, the third support plate 133, and the fourth support plate 134 respectively.

In a specific embodiment shown in FIG. 2, the first frame bar 5111 and the third frame bar 5113 are opposite, while the second frame bar 5112 and the fourth frame bar 5114 are opposite. An inner edge of the first frame bar 5111 is adjacent to the transverse section 5121a of the cantilever weighing portion 512, an inner edge of the third frame bar 5113 is connected to the longitudinal section 5121b of the cantilever weighing portion 512, an inner edge of the second frame bar 5112 is adjacent to one of the second cantilevers 5122, and an inner edge of the fourth frame bar 5114 is adjacent to the other second cantilever 5122.

Thus, the structure of the cantilever weighing portion 512 is more compact, which shortens the volume of the weighing sensor 510, saves a mounting space of the weighing-device mounting groove 120, and hence makes the structure of the split electric rice cooker more compact.

According to some embodiments of the present disclosure, the first support plate 131 has an inverted three-step structure, and the third support plate 133 has an inverted two-step structure. The first frame bar 5111 is apt to abut against a bottom surface of a second step of the first support plate 131; the transverse section 5121a is suspended below a bottom surface of a first step 1311 of the first support plate 131; a clearance space for evading the transverse section 5121a is defined between the first step 1311 and the second step 1312 of the first support plate 131; and the third frame bar 5113 is apt to abut against a bottom surface of a first step 1331 of the third support plate 133.

Specifically, as illustrated in FIG. 2, a third step 1313 of the first support plate 131 is connected to the first side wall 121 of the weighing-device mounting groove 120; the third step 1313, the second step 1312 and the first step 1311 are arranged successively from outside to inside; and the clearance space is defined below the first step 1311 and at an inner side of the second step 1312. A second step 1332 of the third support plate 133 is connected to the third side wall 123 of the weighing-device mounting groove 120, and the second step 1332 and the first step 1331 are arranged successively from outside to inside.

Therefore, an upper surface of the first frame bar 5111 of the body portion 511 of the weighing sensor 510 abuts against the second step 1312 of the first support plate 131, and an upper surface of the third frame bar 5113 of the body portion 511 abuts against the first step 1331 of the third support plate 133; meanwhile, respective upper surfaces of the second frame bar 5112 and the fourth frame bar 5114 of the body portion 511 abut against the vertical snapping plate 140, such that they cooperate with one another to realize vertical position-limiting of the weighing sensor 510.

According to some embodiments of the present disclosure, the bottom surface of the second step 1312 of the first support plate 131 is flush with the bottom surface of the first step 1331 of the third support plate 133. Thus, the body portion 511 of the weighing sensor 510 is in a horizontal state after assembled with various support plates and is subject to a more balanced force, and the support from the support leg 520 connected to the weighing sensor 510 is more stable.

Figure 4:
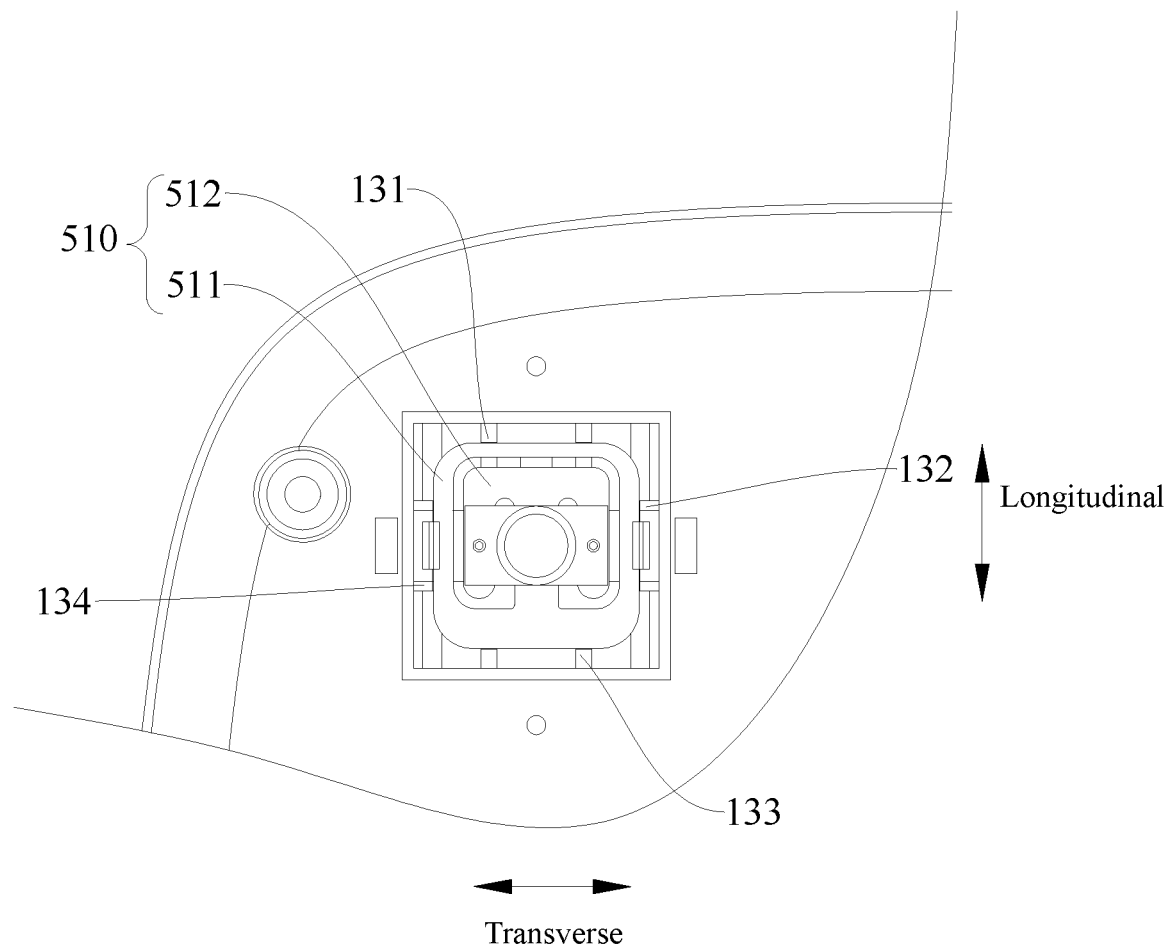
FIG. 4 is a partially enlarged view of FIG. 3.

Combining FIG. 2 and FIG. 4, the third step 1313 of the first support plate 131 and the second step 1332 of the third support plate 133 clamp and respectively abut against the first frame bar 5111 and the third frame bar 5113, so as to limit the position of the body portion 511 in a direction parallel to the longitudinal section 5121b. Specifically, the first frame bar 5111 and the third frame bar 5113 are opposite in a longitudinal direction, a side surface of the third step 1313 of the first support plate 131 abuts against an outer edge of the first frame bar 5111, and a side surface of the second step 1332 of the third support plate 133 abuts against an outer edge of the third frame bar 5113. Thus, the body portion 511 is limited in the longitudinal direction and prevented from shaking in the longitudinal direction.

Referring to FIG. 2, a bottom surface of the third step 1313 of the first support plate 131 and a bottom surface of the second step 1332 of the third support plate 133 are both configured as a guide bevel. Specifically, the guide bevel gradually extends outwards from up to down. Thus, the provision of the guide bevel facilitates the installation of the weighing sensor 510 and makes the installation more convenient.

Figure 3:
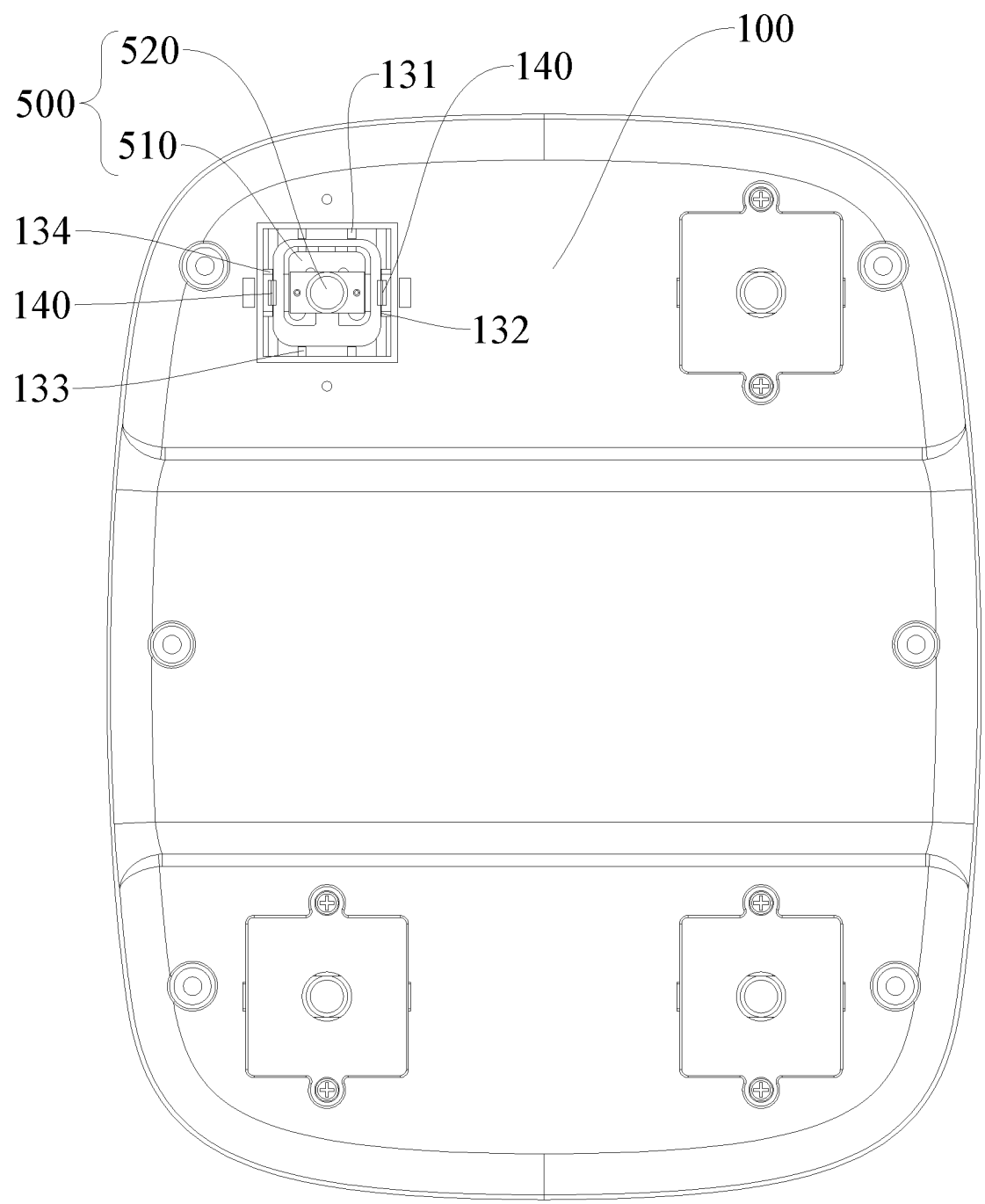
FIG. 3 is a bottom schematic view of a base of a split electric rice cooker according to an embodiment of the present disclosure, with a press cover removed.

Further, referring to FIGS. 3 and 4, the second support plate 132 and the fourth support plate 134 are respectively located outside the second cantilevers 5122 of the corresponding sides to evade the second cantilevers 5122. Specifically, the second frame bar 5112 of the body portion 511 of the weighing sensor 510 has the lower surface abutting against the second support plate 132 and the upper surface abutting against the vertical snapping plate 140; the fourth frame bar 5114 abuts against the fourth support plate 134 and has the upper surface abutting against the vertical snapping plate 140. Thus, the second support plate 132 and the fourth support plate 134 not only support the body portion 511 of the weighing sensor 510 stably, but also avoid interfering with the deformation of the cantilever weighing portion 512 to ensure the accuracy and reliability of weight measurement of the weighing sensor 510.

According to some embodiments of the present disclosure, as shown in FIG. 2, a limiting protrusion 135 is provided on each of the second support plate 132 and the fourth support plate 134, and the limiting protrusion 135 on the second support plate 132 and the limiting protrusion 135 on the fourth support plate 134 clamp and respectively abut against the second frame bar 5112 and the fourth frame bar 5114, so as to limit the position of the body portion 511 in a direction parallel to the transverse section 5121a. Specifically, the second frame bar 5112 and the fourth frame bar 5114 are opposite in a transverse direction, the limiting protrusion of the second support plate 132 abuts against an outer edge of the second frame bar 5112, and the limiting protrusion of the fourth support plate 134 abuts against an outer edge of the fourth frame bar 5114, thereby achieving the position-limiting of the body portion 511 in the transverse direction.

As a preferable embodiment, each of the second support plate 132 and the fourth support plate 134 is divided into two sections spaced apart from each other, and one vertical snapping plate 140 is disposed between the two sections. An inner side of the vertical snapping plate 140 may abut against or be spaced apart from the corresponding support plate. Thus, a snapping force and a clamping force distributed on the body portion 511 can be distributed more evenly, thereby avoiding concentrated distribution of stress on the body portion 511.

In some embodiments, the bottom of the base 100 is further provided with an catching groove 150, the press cover 600 is further provided with a pre-assembled catching portion 602, and the pre-assembled catching portion 602 is engaged within the catching groove 150. Referring to FIG. 2, the press cover 600 is in a substantially square shape, and two opposite edges of the press cover 600 are provided with the pre-assembled catching portion 602. Correspondingly, the shape of the weighing-device mounting groove 120 is consistent with that of the press cover 600. The catching groove 150 is located at an outer side of the weighing-device mounting groove 120 and in one-to-one correspondence to the pre-assembled catching portion 602. During the assembly, the pre-assembled catching portion 602 of the press cover 600 is engaged in the catching groove 150 of the base 100 to implement the pre-assembly of the press cover 600.

Certainly, the number of the pre-assembled catching portion 602 and the catching groove 150 is not limited to two illustrated in FIG. 2, but may be more than two.

In order to enhance the tightness and reliability of the connection between the press cover 600 and the base 100, the press cover 600 can be fastened to the bottom of the base 100 through a press-cover threaded assembly 703. Specifically, each of the other two opposite edges of the press cover 600 is provided with a mounting ear having a mounting hole, the base 100 has a threaded hole corresponding to the mounting hole, and a screw of the press-cover threaded assembly 703 passes through the mounting hole and is tightly fitted with the threaded hole to fasten the press cover 600 on the base 100.

A process of assembling the split electric rice cooker will be described briefly with reference to FIG. 2.

As illustrated in FIG. 2, after the cantilever weighing portion 512 of the weighing sensor 510 and the support leg 520 are fixedly connected together through the screw, the weighing sensor 510 and the support leg 520 as a whole are placed into the weighing-device mounting groove 120, with the body portion 511 vertically snapped between the vertical snapping plate 140 and the support plates. Specifically, the upper surface of the first frame bar 5111 of the body portion 511 abuts against the bottom surface of the second step 1312 of the first support plate 131; the upper surface of the third frame bar 5113 of the body portion 511 abuts against the bottom surface of the first step 1331 of the third support plate 133; the upper surface of the second frame bar 5112 of the body portion 511 abuts against a bottom surface of the second support plate 132; the upper surface of the fourth frame bar 5114 of the body portion 511 abuts against a bottom surface of the fourth support plate 134; the respective lower surfaces of the second frame bar 5112 and the fourth frame bar 5114 of the body portion 511 abut against the snap hook of the vertical snapping plate 140. Thus, the body portion 511 is vertically limited.

Meanwhile, the body portion 511 is transversely clamped between the limiting protrusion of the second support plate 132 and the limiting protrusion of the fourth support plate 134, and the body portion 511 is longitudinally clamped between the first support plate 131 and the third support plate 133, such that the body portion 511 is fixed in the horizontal direction.

Afterwards, the pre-assembled catching portion 602 of the press cover 600 is mounted in the catching groove 150 of the base 100, and the press cover 600 and the base 100 are fastened and connected together through the press-cover threaded assembly 703. Till now, the assembly of the weighing sensor 510 onto the base 100 is completed.

A split electric rice cooker according to embodiments of a second aspect of the present disclosure will be described in detail with reference to FIG. 5 to FIG. 8

Figure 5:
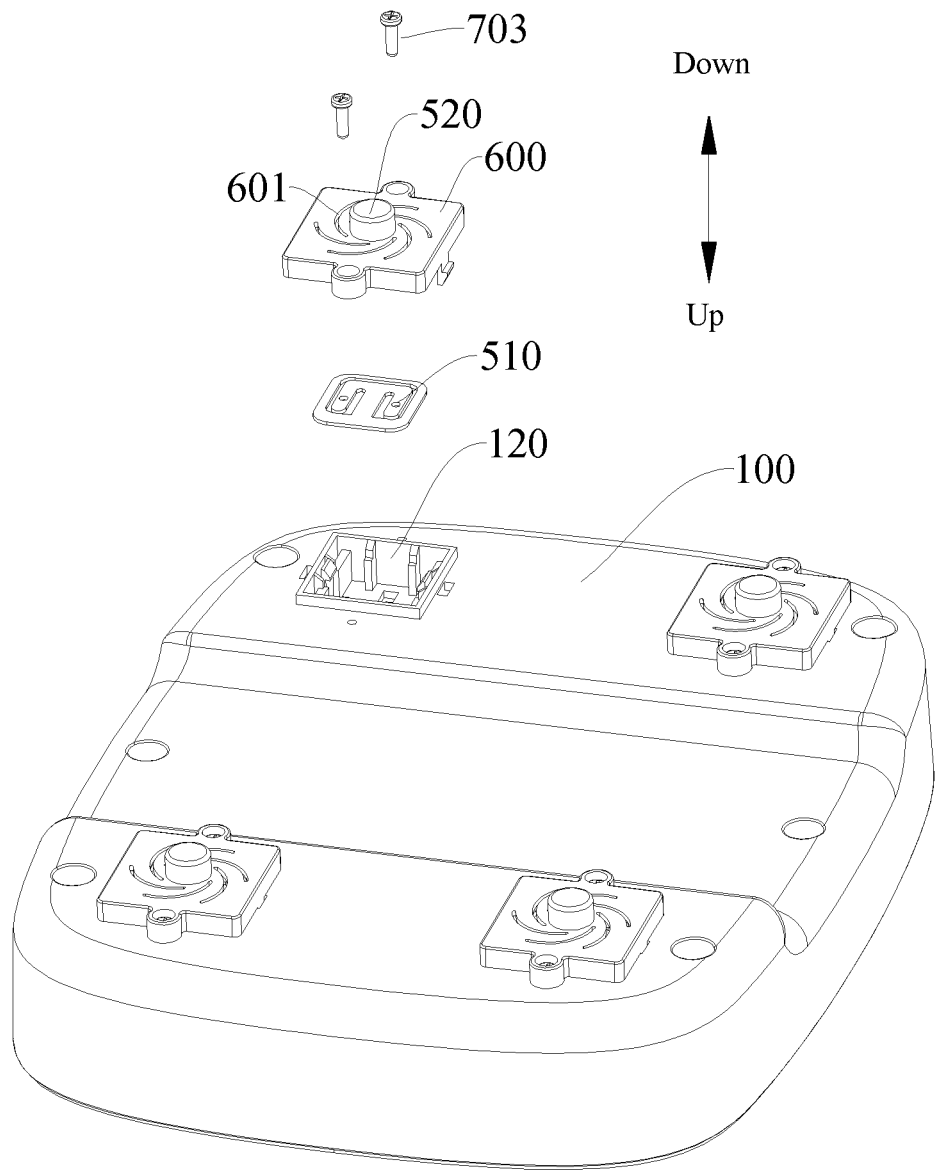
FIG. 5 is a partially exploded schematic view of a split electric rice cooker according to embodiments of a second aspect of the present disclosure.

As illustrated in FIG. 5, the split electric rice cooker according to embodiments of the present disclosure includes a base 100, a cooker body, a weighing device 500 and a press cover 600.

The base 100 is provided with a weighing-device mounting groove 120 at the bottom thereof, the cooker body is configured to rest on the base 100 and is separable with respect to the base 100, and the weighing device is provided in the weighing-device mounting groove 120. The weighing device may be a weighing sensor 510, the weighing sensor 510 includes a body portion 511 and a cantilever weighing portion 512, and the cantilever weighing portion 512 is disposed to the body portion 511. The press cover 600 is provided at the bottom of the base 100 and shields the weighing-device mounting groove 120, and the press cover 600 is integrally provided with a support leg 520. The support leg 520 is supported on a bottom surface of the cantilever weighing portion 512, and can be deformed along with the press cover 600 and push the cantilever weighing portion 512 upwards.

For the split electric rice cooker according to embodiments of the present disclosure, by configuring the press cover 600 and the support leg 520 into the integral structure, and enabling the support leg 520 under pressure to move upwards relative to the base 100 and hence push the cantilever weighing portion 512 to deform the cantilever weighing portion 512, the weighing sensor 510 obtains a corresponding weight change value based on the amount of deformation of the support leg 520, and in such a way the weight measurement of the cooker body is achieved. Due to the integral structure of the press cover 600 and the support leg 520, the assembly procedure is simplified, the production cost is saved, and the split electric rice cooker has a more compact structure and is more convenient to assemble.

According to some embodiments of the present disclosure, the press cover 600 is provided with a weakening structure. It could be understood that the weakening structure means weakening the rigidity of the press cover 600 to make the press cover 600 more easily deformed. Thus, when the cooker body is mounted on the base 100, the press cover 600 having the weakening structure is more easily deformed and generates a larger amount of deformation. In such a way, the pushing force of the press cover 600 on the cantilever weighing portion 512 is stronger, which improves the sensitivity of the weighing sensor 510 and the accuracy of the measurement result.

In a specific embodiment illustrated in FIG. 5, the weakening structure is a weakening groove 601 penetrating the press cover 600. Thus, by providing the press-cover clearance hole 601 in the press cover 600, it is possible to weaken the rigidity of the press cover 600, save materials, and reduce costs.

Certainly, the weakening structure is not limited to the weakening groove 601 of the press cover 600, and rather, the weakening structure may a concave groove that does not penetrate the press cover 600; alternatively, the press cover 600 is not provided with any groove, but employs an easily deformable material, so as to achieve the weakening effect.

In the specific embodiment of FIG. 5, the weakening groove 601 is arc-shaped. Certainly, the present disclosure is not limited thereto, and the weakening groove 601 may be linear.

According to some embodiments of the present disclosure, as illustrated in FIG. 5, a plurality of weakening grooves 601 are provided and distributed around the support leg. A distance between an inner end of each weakening groove 601 and a central axis of the support leg 520 is smaller than a distance between an outer end of the weakening groove 601 and the central axis. Thus, the plurality of weakening grooves 601 are distributed in a spiral shape, to make the force distribution on the press cover 600 more uniform.

According to some embodiments of the present disclosure, respective inner ends of the weakening grooves 601 are equally distant from the central axis, and respective outer ends of the weakening grooves 601 are also equally distant from the central axis. Further, the plurality of weakening grooves 601 are equally spaced. Thus, the uniformity of the force distribution on the press cover 600 is further enhanced, and the rigidity of the press cover 600 is also weakened in a more balanced manner.

Figure 8:
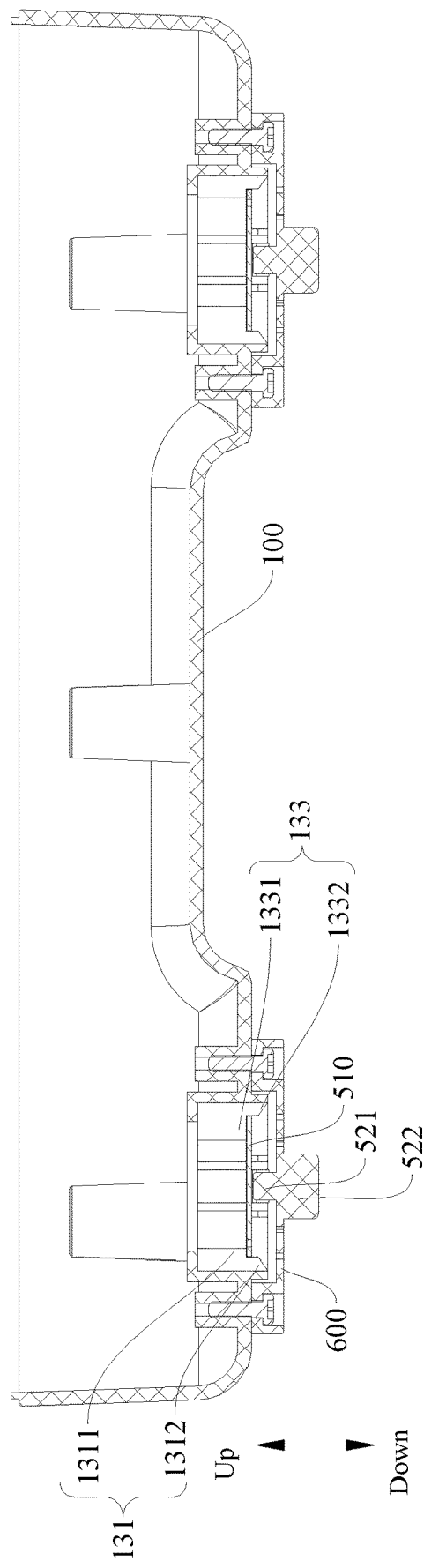
FIG. 8 is a sectional schematic view of FIG. 7.

In some embodiments, as illustrated in FIG. 8, the support leg 520 includes an upper leg portion 521 and a lower leg portion 522, the lower leg portion 522 is provided to a bottom surface of the press cover 600 while the upper leg portion 521 is provided to a top surface of the press cover 600, and a radial size of the upper leg portion 521 is smaller than a radial size of the lower leg portion 522. Therefore, the base 100 is stably supported by the lower leg portion 522, and the cantilever weighing portion 512 is pushed upwards by the upper leg portion 521 to be deformed and hence perform weighing, which cannot only guarantee the weighing accuracy, but also enhance the stability of the split electric rice cooker.

The press cover 600 and the support leg 520 may be an integrally injection-molded part. That is, the press cover 600 and the support leg 520 can be integrally formed by an injection molding process, thereby facilitating the processing and mass production.

Figure 6:
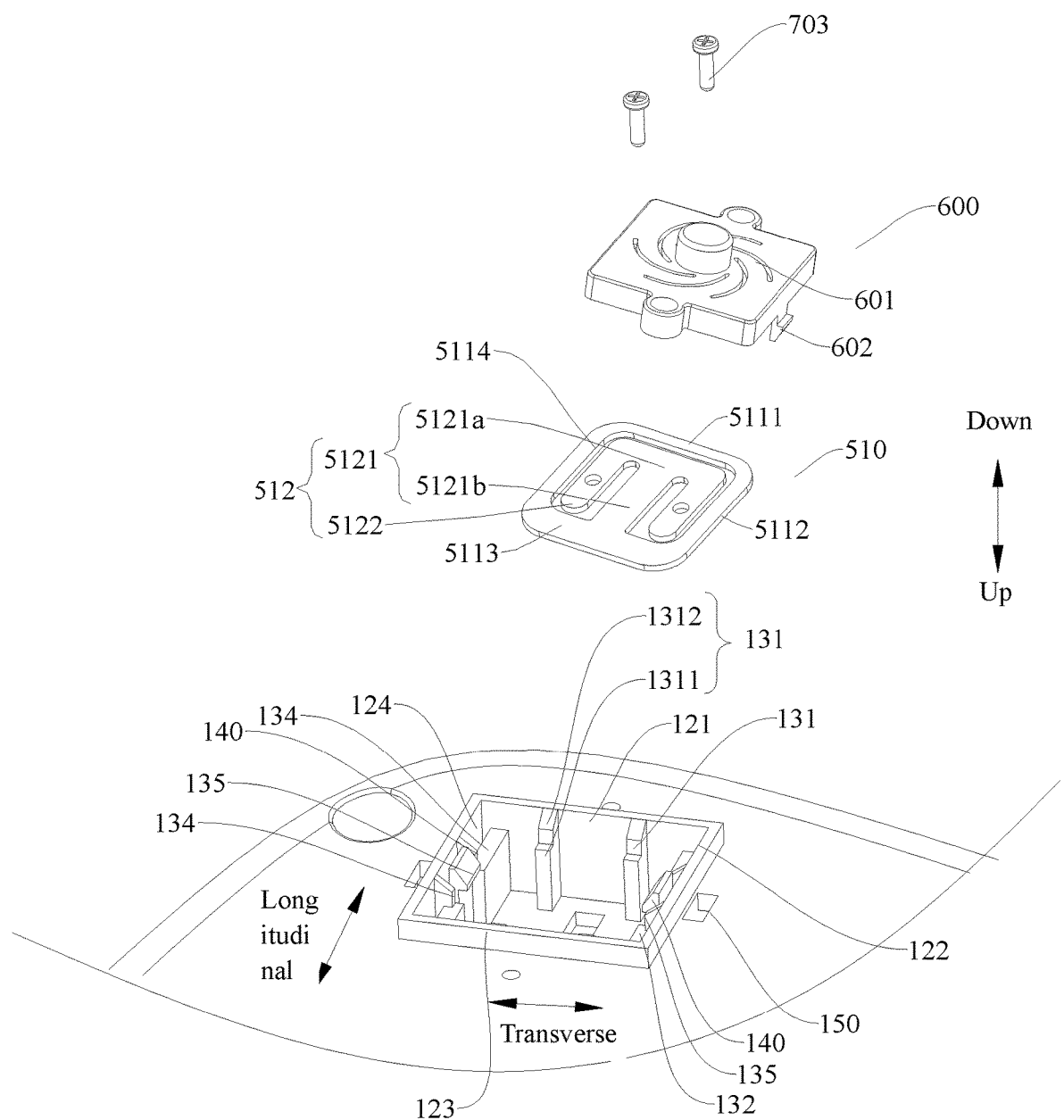
FIG. 6 is a partially enlarged view of FIG. 5.
Figure 7:
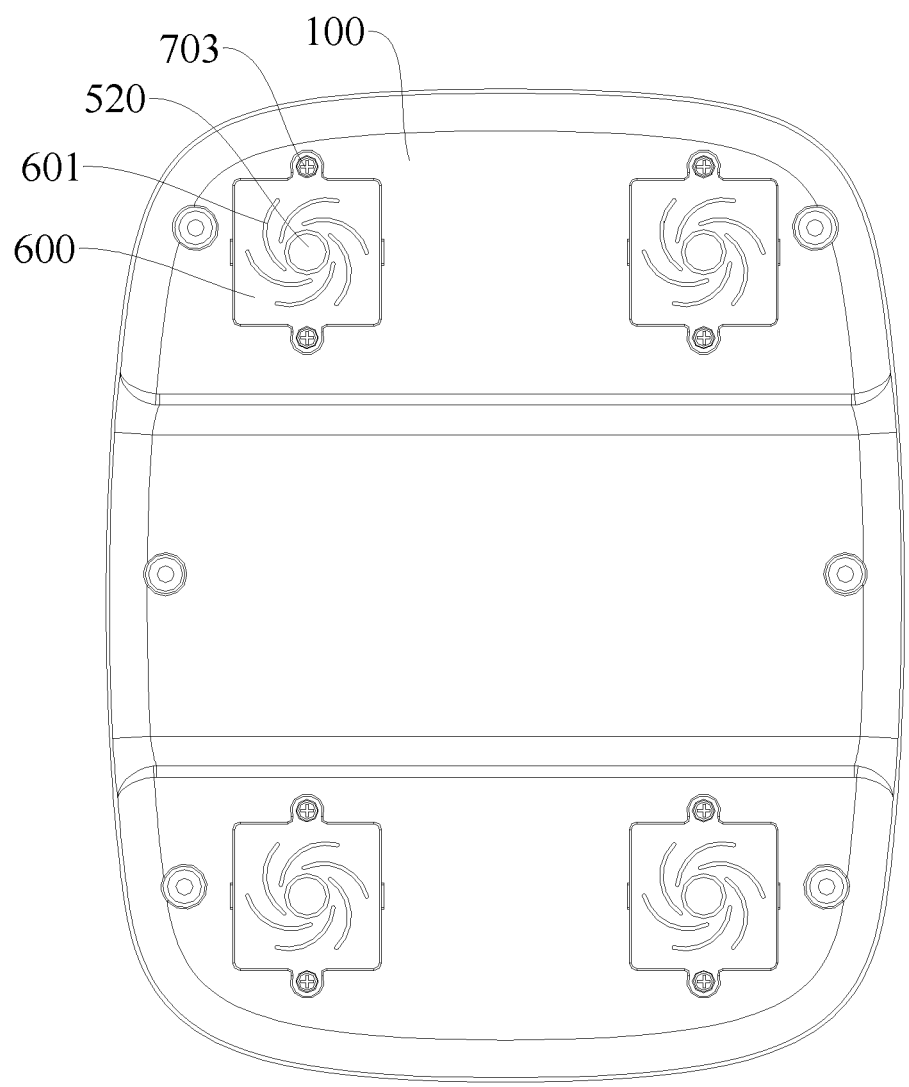
FIG. 7 is a partial schematic view of a split electric rice cooker according to an embodiment of the present disclosure.

In some other embodiments, as illustrated in FIG. 6, the bottom of the base 100 is further provided with an catching groove 150, the press cover 600 is further provided with a pre-assembled catching portion 602, and the pre-assembled catching portion 602 is engaged in the catching groove 150. Referring to FIG. 6, the press cover 600 is in a substantially square shape, and two opposite edges of the press cover 600 are provided with the pre-assembled catching portion 602. Correspondingly, the shape of the weighing-device mounting groove 120 is consistent with that of the press cover 600. The catching groove 150 is located at an outer side of the weighing-device mounting groove 120 and in one-to-one correspondence to the pre-assembled catching portion 602. During the assembly, the pre-assembled catching portion 602 of the press cover 600 is engaged in the catching groove 150 of the base 100 to implement the pre-assembly of the press cover 600.

Certainly, the number of the pre-assembled catching portion 602 and the catching groove 150 is not limited to two illustrated in FIG. 6, but may be more than two.

In order to enhance the tightness and reliability of the connection between the press cover 600 and the base 100, the press cover 600 can be fastened to the bottom of the base 100 through a press-cover threaded assembly 703. Specifically, each of the other two opposite edges of the press cover 600 is provided with a mounting ear having a mounting hole, the base 100 has a threaded hole corresponding to the mounting hole, and a screw of the press-cover threaded assembly 703 passes through the mounting hole and is tightly fitted with the threaded hole to fasten the press cover 600 on the base 100.

In the split electric rice cooker according to an embodiment of the present disclosure, the weighing-device mounting groove 120 is provided with a support plate and a vertical snapping plate 140 therein, and the weighing sensor 510 is sandwiched between the vertical snapping plate 140 and the support plate. Therefore, the weighing sensor 510 is fastened by the support plate and the vertical snapping plate 140 together provided in the weighing-device mounting groove 120, hence the structure becomes simple and compact, and the disassembly is convenient.

The vertical snapping plate 140 can fasten the weighing sensor 510 in a vertical direction, and the vertical snapping plate 140 and the support plate together can limit the weighing sensor 510 in a horizontal direction to prevent the weighing sensor 510 from rotating.

Referring to FIGS. 6 and 8, according to some embodiments of the present disclosure, the support plate includes a first support plate 131, a second support plate 132, a third support plate 133, and a fourth support plate 134. The first support plate 131, the second support plate 132, the third support plate 133, and the fourth support plate 134 are provided to a first side wall 121, a second side wall 122, a third side wall 123 and a fourth side wall 124 of the weighing-device mounting groove 120 respectively, in which the first side wall 121, the second side wall 122, the third side wall 123 and the fourth side wall 124 are connected successively.

Specifically, the weighing-device mounting groove 120 exhibits a substantially square groove, the first side wall 121 and the third side wall 123 of the weighing-device mounting groove 120 are opposite, the second side wall 122 and the fourth side wall 124 thereof are opposite, and the first to fourth side walls are provided with the first to fourth support plates respectively. An upper surface of the weighing sensor 510 is opposite to respective lower surfaces of the first to fourth support plates, and a lower surface of the weighing sensor 510 abuts against a snap hook of the vertical snapping plate 140, so as to limit the position of the weighing sensor 510 in the vertical direction; respective side surfaces of the first to fourth side walls abut against an outer edge of the weighing sensor 510, so as to limit the position of the weighing sensor 510 in the horizontal direction.

Therefore, the horizontal position-limiting of the weighing sensor 510 is achieved through the first to fourth support plates, to effectively prevent horizontal rotation of the weighing sensor 510, and enhance stability and reliability of the weighing sensor 510 fixed in the weighing-device mounting groove 120.

According to some embodiments of the present disclosure, the body portion 511 is an annular frame body, and the cantilever weighing portion 512 is provided within the body portion 511. Specifically, as illustrated in FIG. 6, the cantilever weighing portion 512 is connected to a part of an inner edge of the body portion 511, the support leg 520 is fixedly connected to a cantilever support portion, and the body portion 511 and the weighing-device mounting groove 120 are fixedly connected.

In this way, the support leg 520 of the base 100 is placed on the ground, and then the cooker body is placed on the base 100; the press cover 600 is elastically deformed under the pressure of a heavy object, the weighing device and the base move towards the support leg (i.e. move downwards), and the support leg is pushed against the cantilever weighing portion of the weighing device, such that the weighing sensor 510 sends a corresponding weighing signal based on the amount of elastic deformation, thereby finally realizing measurement of the weight of the cooker body.

Further, the cantilever weighing portion 512 includes a first cantilever 5121 and a second cantilever 5122. The first cantilever 5121 is T-shaped and includes a transverse section 5121a and a longitudinal section 5121b, the longitudinal section 5121b is connected to the body portion 511, and two ends of the transverse section 5121a are separately provided with the second cantilever 5122, as illustrated in FIG. 6.

Therefore, after the cooker body is placed on the base 100, the body portion 511 moves downwards under the pressure of the heavy object, and drives the longitudinal section 5121b to move and produce elastic deformation with respect to the transverse section 5121a and the second cantilever 5122. The cantilever weighing portion 512 with the above structure can produce the elastic deformation easily and have high sensitivity of weight sensing, and the deformation of the cantilever weighing portion 512 is distributed more evenly, resulting in a more accurate detection result.

In some embodiments, as illustrated in FIG. 6, the body portion 511 includes a first frame bar 5111, a second frame bar 5112, a third frame bar 5113, and a fourth frame bar 5114 connected successively. The first frame bar 5111 is adjacent to the transverse section 5121a. The first frame bar 5111, the second frame bar 5112, the third frame bar 5113, and the fourth frame bar 5114 are apt to abut against the first support plate 131, the second support plate 132, the third support plate 133, and the fourth support plate 134 respectively.

In a specific embodiment shown in FIG. 6, the first frame bar 5111 and the third frame bar 5113 are opposite, while the second frame bar 5112 and the fourth frame bar 5114 are opposite. An inner edge of the first frame bar 5111 is adjacent to the transverse section 5121a of the cantilever weighing portion 512, an inner edge of the third frame bar 5113 is connected to the longitudinal section 5121b of the cantilever weighing portion 512, an inner edge of the second frame bar 5112 is adjacent to one of the second cantilevers 5122, and an inner edge of the fourth frame bar 5114 is adjacent to the other second cantilever 5122.

Thus, the structure of the cantilever weighing portion 512 is more compact, which shortens the volume of the weighing sensor 510, saves a mounting space of the weighing-device mounting groove 120, and hence makes the structure of the split electric rice cooker more compact.

According to some embodiments of the present disclosure, the first support plate 131 and the third support plate 133 each have an inverted two-step structure; the first frame bar 5111 is apt to abut against a bottom surface of a first step 1311 of the first support plate 131; the third frame bar 5113 is apt to abut against a bottom surface of a first step 1331 of the third support plate 133.

Therefore, an upper surface of the first frame bar 5111 of the body portion 511 of the weighing sensor 510 abuts against the first step 1311 of the first support plate 131, and an upper surface of the third frame bar 5113 of the body portion 511 abuts against the first step 1331 of the third support plate 133; meanwhile, respective upper surfaces of the second frame bar 5112 and the fourth frame bar 5114 of the body portion 511 abut against the vertical snapping plate 140, such that they cooperate with one another to realize vertical position-limiting of the weighing sensor 510.

Further, referring to FIGS. 6 and 8 together, a second step 1312 of the first support plate 131 and a second step 1332 of the third support plate 133 clamp and respectively abut against the first frame bar 5111 and the third frame bar 5113, so as to limit the position of the body portion in a direction parallel to the longitudinal section 5121b. Thus, a side surface of the second step 1312 of the first support plate 131 abuts against the first frame bar 5111, and a side surface of the second step 1332 of the third support plate 133 abuts against the third frame bar. Thus, the body portion is limited in the longitudinal direction.

As illustrated in FIGS. 6 and 8, according to some embodiments of the present disclosure, the second support plate 132 and the fourth support plate 134 are respectively located outside the second cantilevers 5122 of the corresponding sides to evade the second cantilevers 5122. Specifically, the second frame bar 5112 of the body portion 511 of the weighing sensor 510 has the lower surface abutting against the second support plate 132 and the upper surface abutting against the vertical snapping plate 140; the fourth frame bar 5114 abuts against the fourth support plate 134 and has the upper surface abutting against the vertical snapping plate 140. Thus, the second support plate 132 and the fourth support plate 134 not only support the body portion 511 of the weighing sensor 510 stably, but also avoid interfering with the deformation of the cantilever weighing portion 512 to ensure the accuracy and reliability of weight measurement of the weighing sensor 510.

According to some embodiments of the present disclosure, a limiting protrusion 135 is provided on each of the second support plate 132 and the fourth support plate 134, and the limiting protrusion 135 on the second support plate 132 and the limiting protrusion 135 on the fourth support plate 134 clamp and respectively abut against the second frame bar 5112 and the fourth frame bar 5114, so as to limit the position of the body portion in a direction parallel to the transverse section 5121a. Specifically, the second frame bar 5112 and the fourth frame bar 5114 are opposite in a transverse direction, the limiting protrusion of the second support plate 132 abuts against an outer edge of the second frame bar 5112, and the limiting protrusion of the fourth support plate 134 abuts against an outer edge of the fourth frame bar 5114, thereby achieving the position-limiting of the body portion 511 in the transverse direction.

As a preferable embodiment, each of the second support plate 132 and the fourth support plate 134 is divided into two sections spaced apart from each other, and one vertical snapping plate 140 is disposed between the two sections. An inner side of the vertical snapping plate 140 may abut against or be spaced apart from the corresponding support plate.

Thus, a snapping force and a clamping force distributed on the body portion 511 can be distributed more evenly, thereby avoiding concentrated distribution of stress on the body portion 511.

A process of assembling the split electric rice cooker will be described briefly with reference to FIGS. 6 and 8.

The weighing sensor 510 is placed into the weighing-device mounting groove 120 in such a way that the body portion 511 is vertically clamped between the vertical snapping plate 140 and the support plates.

Meanwhile, the body portion 511 is transversely clamped between the limiting protrusion of the second support plate 132 and the limiting protrusion of the fourth support plate 134, and the body portion 511 is longitudinally clamped between the first support plate 131 and the third support plate 133, such that the body portion 511 is fixed in the horizontal direction.

Afterwards, the pre-assembled catching portion 602 of the press cover 600 is mounted in the catching groove 150 of the base 100, and the press cover 600 and the base 100 are fastened and connected together through the press-cover threaded assembly 703. Till now, the assembly of the weighing sensor 510 onto the base 100 is completed.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise" "axially," "radially," and "circumferentially" should be construed to refer to the orientation as then described or as shown in the drawings under discussion. These relative terms are for convenience of description, and do not indicate or imply that the present disclosure have a particular orientation or be constructed or operated in a particular orientation, thus cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine and combine the different embodiments or examples described in this specification and features of different embodiments or examples without conflicting with each other.

Although embodiments have been shown and described, it would be appreciated that the above embodiments are explanatory and cannot be construed to limit the present disclosure, and changes, modifications, alternatives and variants can be made in the embodiments by those skilled in the art in the scope of the present disclosure.

What is claimed is:

1. A split electric rice cooker, comprising:
   a base provided with a weighing-device mounting groove at a bottom thereof;
   a cooker body configured to rest on the base and separable with respect to the base;
   a weighing device provided in the weighing-device mounting groove, the weighing device comprising a weighing sensor and a support leg; and
   a press cover provided to the bottom of the base and shielding the weighing-device mounting groove, the press cover being provided with a press-cover clearance hole for the support leg to pass downwards, and the support leg being connected to the weighing sensor;
   wherein:
   the weighting sensor comprises a body portion and a cantilever weighting portion provided on the body portion, the supporting leg is provided on a bottom surface of the cantilever weighting portion and is configured to be deformed along with the press cover and to push the cantilever weighting portion upwards;
   the press cover is provided with a weakening structure, wherein the weakening structure is an arc-shaped weakening groove; and
   a plurality of weakening grooves are provided and distributed around the support leg, and a distance between an inner end of each weakening groove and a central axis of the support leg is smaller than a distance between an outer end of the weakening groove and the central axis.

2. The split electric rice cooker according to claim 1, wherein a support plate and a vertical snapping plate are provided in the weighing-device mounting groove, and the weighing sensor is sandwiched between the vertical snapping plate and the support plate.

3. The split electric rice cooker according to claim 2, wherein the weighing sensor comprises a body portion and a cantilever weighing portion, the body portion is an annular frame body, and the cantilever weighing portion is provided within the body portion.

4. The split electric rice cooker according to claim 3, wherein the cantilever weighing portion comprises a first cantilever and a second cantilever; the first cantilever is T-shaped and comprises a transverse section and a longitudinal section; the longitudinal section is connected to the body portion, and two ends of the transverse section are separately provided with the second cantilever.

5. The split electric rice cooker according to claim 4, wherein the support plate comprises: a first support plate, a second support plate, a third support plate, and a fourth support plate; the first support plate, the second support plate, the third support plate, and the fourth support plate are provided to a first side wall, a second side wall, a third side wall and a fourth side wall of the weighing-device mounting groove respectively; the first side wall, the second side wall, the third side wall and the fourth side wall are connected successively.

6. The split electric rice cooker according to claim 5, wherein the body portion comprises: a first frame bar, a second frame bar, a third frame bar, and a fourth frame bar connected successively; the first frame bar is adjacent to the transverse section; the first frame bar, the second frame bar, the third frame bar, and the fourth frame bar are apt to abut against the first support plate, the second support plate, the third support plate, and the fourth support plate respectively.

7. The split electric rice cooker according to claim 6, wherein the first support plate has an inverted three-step structure;
   the third support plate has an inverted two-step structure;
   the first frame bar is apt to abut against a bottom surface of a second step of the first support plate; the transverse section is suspended below a bottom surface of a first step of the first support plate; a clearance space for evading the transverse section is defined between the first step and the second step of the first support plate; and the third frame bar is apt to abut against a bottom surface of a first step of the third support plate.

8. The split electric rice cooker according to claim 6, wherein the second support plate and the fourth support plate are respectively located outside the second cantilevers of the corresponding sides to evade the second cantilevers.

9. The split electric rice cooker according to claim 6, wherein a limiting protrusion is provided on each of the second support plate and the fourth support plate, and the limiting protrusion on the second support plate and the limiting protrusion on the fourth support plate clamp and respectively abut against the second frame bar and the fourth frame bar, so as to limit the position of the body portion in a direction parallel to the transverse section.

10. The split electric rice cooker according to claim 6, wherein each of the second support plate and the fourth support plate is divided into two sections spaced apart from each other, and one vertical snapping plate is disposed between the two sections.

11. The split electric rice cooker according to claim 1, wherein the support leg comprises an upper leg portion and a lower leg portion, the lower leg portion is provided to a bottom surface of the press cover while the upper leg portion is provided to a top surface of the press cover, and a radial size of the upper leg portion is smaller than a radial size of the lower leg portion.

12. The split electric rice cooker according to claim 1, wherein the bottom of the base is further provided with an catching groove, the press cover is further provided with a pre-assembled catching portion, and the pre-assembled catching portion is engaged within the catching groove; or the press cover is further fastened to the bottom of the base through a press-cover threaded assembly.

13. A split electric rice cooker, comprising:
   a base provided with a weighing-device mounting groove at a bottom thereof;
   a cooker body configured to rest on the base and separable with respect to the base;
   a weighing device provided in the weighing-device mounting groove, the weighing device comprising a weighing sensor and a support leg; and
   a press cover provided to the bottom of the base and shielding the weighing-device mounting groove, the press cover being provided with a press-cover clearance hole for the support leg to pass downwards, and the support leg being integrally provided to the press cover and able to push the weighing sensor along with deformation of the press cover;
   wherein:
   the weighting sensor comprises a body portion and a cantilever weighting portion provided on the body portion, the supporting leg is provided on a bottom surface of the cantilever weighting portion and is configured to be deformed along with the press cover and to push the cantilever weighting portion upwards;

the press cover is provided with a weakening structure, wherein the weakening structure is an arc-shaped weakening groove; and a plurality of weakening grooves are provided and distributed around the support leg, and a distance between an inner end of each weakening groove and a central axis of the support leg is smaller than a distance between an outer end of the weakening groove and the central axis.

14. The split electric rice cooker according to claim 13, wherein the weakening structure is a weakening groove penetrating the press cover.

15. The split electric rice cooker according to claim 13, wherein the support leg comprises an upper leg portion and a lower leg portion, the lower leg portion is provided to a bottom surface of the press cover while the upper leg portion is provided to a top surface of the press cover, and a radial size of the upper leg portion is smaller than a radial size of the lower leg portion.

16. The split electric rice cooker according to claim 13, wherein the bottom of the base is further provided with an catching groove, the press cover is further provided with a pre-assembled catching portion, and the pre-assembled catching portion is engaged within the catching groove; or the press cover is further fastened to the bottom of the base through a press-cover threaded assembly.

* * * * *